United States Patent [19]

Attwood

[11] Patent Number: 4,692,851
[45] Date of Patent: Sep. 8, 1987

[54] HARMONIC-RESONANT POWER SUPPLY

[76] Inventor: Brian E. Attwood, Sestri, 49 Smithbarn, Horsham, Sussex, England

[21] Appl. No.: 708,011

[22] Filed: Mar. 4, 1985

[30] Foreign Application Priority Data

Feb. 2, 1985 [GB] United Kingdom ............... 8502689

[51] Int. Cl.⁴ .......................................... H02M 3/337
[52] U.S. Cl. ........................................ 363/16; 363/37
[58] Field of Search ..................... 363/17, 37, 40, 98, 363/16

[56] References Cited

U.S. PATENT DOCUMENTS

| | | |
|---|---|---|
| 3,737,755 | 6/1973 | Calkin et al. |
| 3,909,695 | 9/1975 | Peck . |
| 4,300,191 | 11/1981 | Baronowski et al. .................. 363/17 |
| 4,319,316 | 3/1982 | Farrer et al. ........................... 363/41 |
| 4,475,149 | 10/1984 | Gallios .................................. 363/17 |

FOREIGN PATENT DOCUMENTS

| | | |
|---|---|---|
| 0107313 | 2/1984 | European Pat. Off. . |
| 125588 | 11/1984 | European Pat. Off. .............. 363/98 |
| 179178 | 10/1983 | Japan ..................................... 363/17 |
| 2057168 | 3/1981 | United Kingdom ................... 363/17 |
| 2060220 | 4/1981 | United Kingdom . |
| 1597606 | 9/1981 | United Kingdom . |
| 2137030 | 9/1984 | United Kingdom . |

OTHER PUBLICATIONS

Bailey et al, "200 KHz Power FET Technology in OEM Modular Power Supplies," El. Eng., vol. 53, No. 656, pp. 39–42, 45–49, Sep. 1981.
"High Frequency Series Resonant Power Supply" by Raoji Patel and Roger Adair, SEM-300, Unitrode Corp., pp. 5-1 to 5-12.
International Search Report, App. No. PCT/GB86/0059, Completed Apr. 28, 1986.
R. L. Steigerwald: "High Frequency Resonant Transistor DC–DC Converters", IEEE 1984, Transactions on Ind. Elect., IE-31, #2, 5-84, N.Y.

Primary Examiner—William H. Beha, Jr.
Attorney, Agent, or Firm—Sheldon & Mak

[57] ABSTRACT

A switching inverter power supply has a harmonic semi-resonant circuit associated with an isolation transformer for reducing electromagnetic interference. Fixed-frequency operation with pulse width modulation for regulation is accompanied by controlled current rise and fall times in the transformer primary. The semi-resonant circuit comprises an inductor in series with the transformer primary and a capacitor in parallel with the transformer secondary, transformer leakage inductance being included in the resonance. In one version, the resonant frequency can be set from about the fifth to about the twentieth harmonic of the fixed switching frequency for reducing peak switching currents.

12 Claims, 6 Drawing Figures

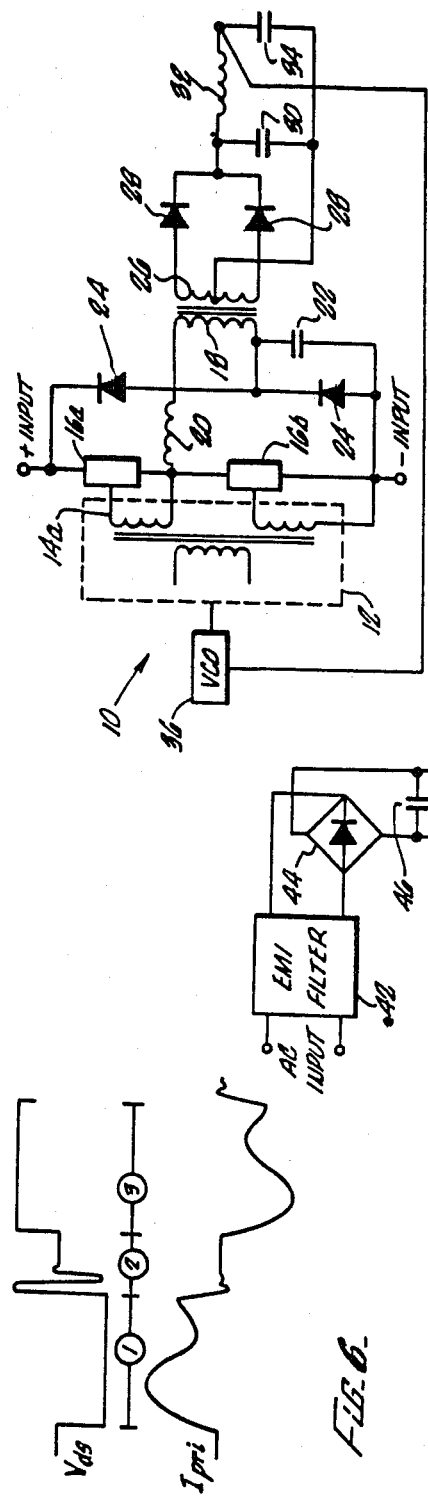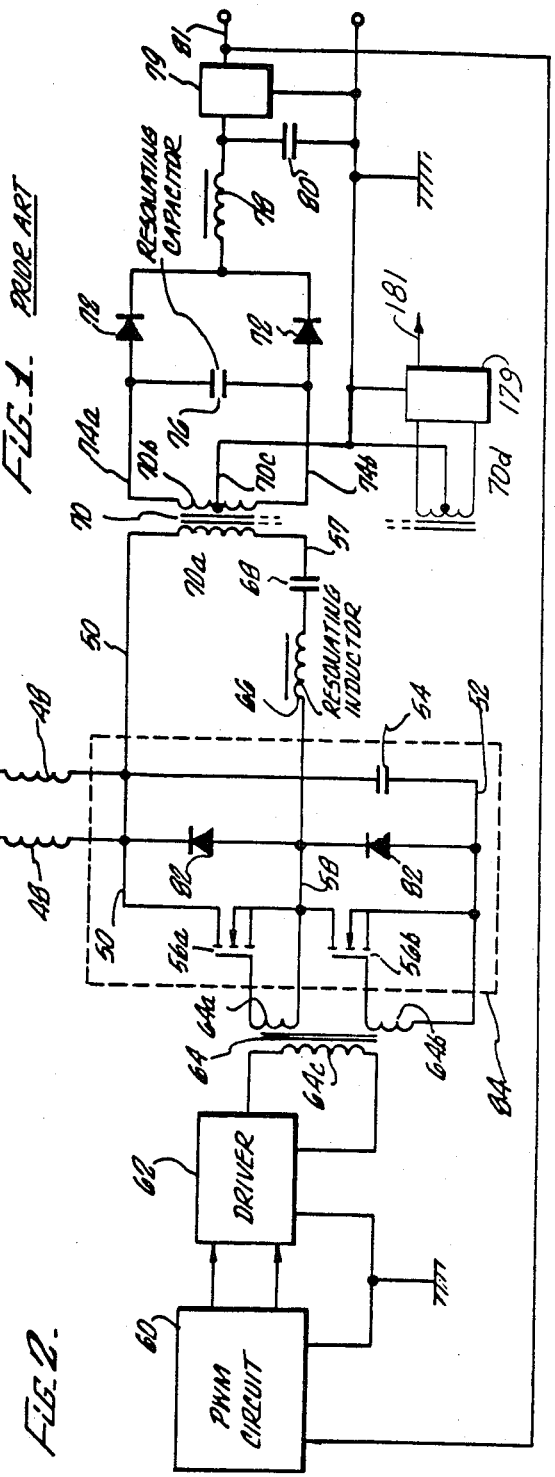

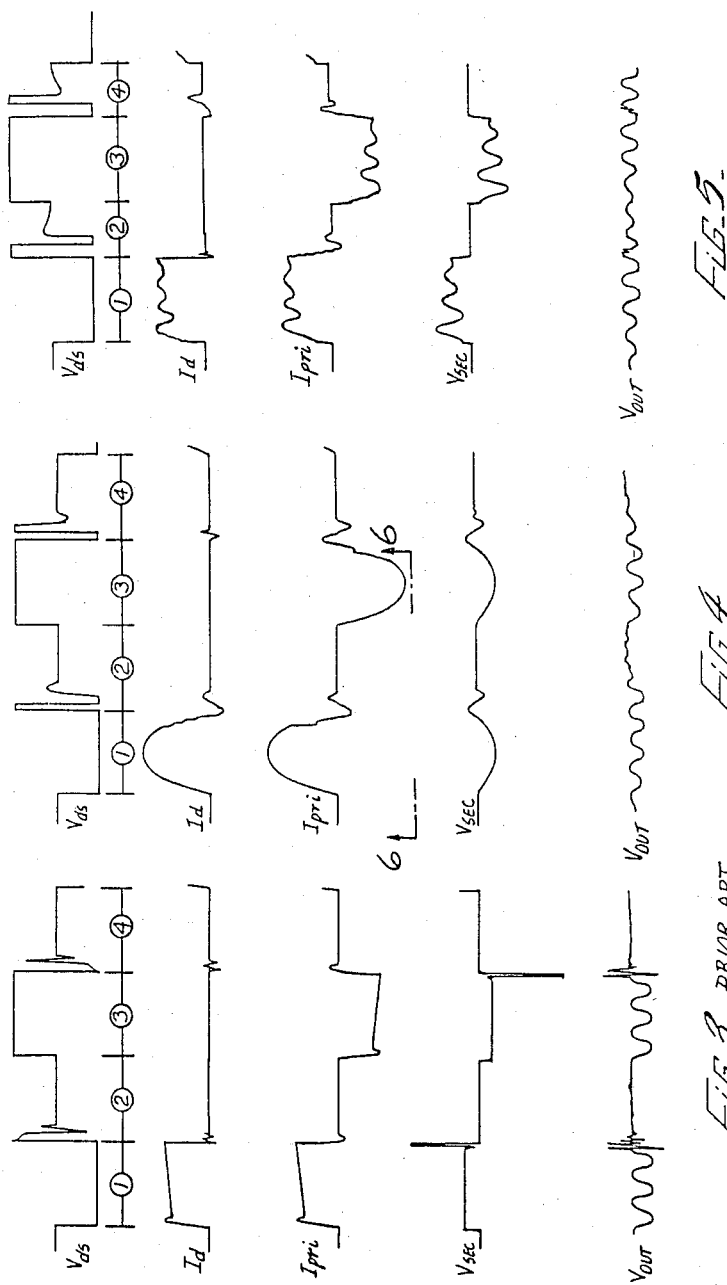

HARMONIC-RESONANT POWER SUPPLY

BACKGROUND

This invention relates to switched mode electrical power conversion and more particularly to a low EMI semi-resonant inverter DC power supply.

Conventional switching inverters using pulse width modulation (PWM) for regulation are well known to provide significant energy and space savings in a variety of power supply applications. In a typical circuit, the primary of an inverter transformer is repetitively switched between positive and negative sides of an input voltage source for inducing an AC voltage at the transformer secondary. The AC voltage is rectified and filtered to obtain a DC output voltage. Regulation of the DC output voltage is obtained by varying the duration (pulse width) of fixed frequency switching control signals in response to changes in the DC output voltage.

A principal disadvantage of switched mode power supplies of the prior art is that high levels of electromagnetic interference (EMI) are associated with operation of switching devices in inverter circuits.

High levels of both conducted and radiated EMI, especially at radio frequencies (RF) can be detrimental to proper operation of equipment utilizing switched mode power supplies as well as other equipment located nearby. Increasingly stringent government regulations limiting electrical interference have resulted from increased interference to radio communications by a proliferation of incidental signals generated by electronic equipment. Electronic products marketed in the United States must meet Federal Communications Commission standards for RF emmissions under Parts 15 and 18 of the Federal Communications Act. In European countries which are in close geographical proximity and where the radio frequency spectrum is nearly saturated, particularly strict rules are in effect.

A relatively new solution to the EMI problem in switched mode supplies is to incorporate a series resonant circuit in the inverter, limiting the switching signals to a fixed pulse duration, and using frequency modulation (FM) of the pulse repetition rate for regulation instead of the conventional PWM at a fixed-frequency. Significantly reduced EMI results from switching the inverter when current in the switch is zero.

With reference to FIG. 1, a prior art series resonant FM power supply 10 includes a pulse generator 12 having a pair of transformer-coupled control outputs 14a and 14b, for driving a corresponding pair of power switches 16a and 16b. During a fixed first time period the control output 14a drives the power switch 16a to connect a transformer primary 18 through a series inductor 20 to a positive input voltage. During a fixed second time period equal in duration and immediately following the first time period, the control output 14b drives the power switch 16b to connect the series inductor 20 to a negative input voltage. The transformer primary 18 is coupled in series to the negative input voltage by a series resonant capacitor 22, the series resonant capacitor 22 being clamped between the positive and negative input voltages by a pair of primary rectifier diodes 24. An induced AC voltage at a transformer secondary 26, rectified by a pair of secondary diodes 28, produces a DC voltage across a filter capacitor 30. The DC voltage is fed through an additional low-pass filter comprising a filter inductor 32 and an output capacitor 34 to produce a DC output voltage.

The DC output voltage is fed back to a voltage controlled oscillator 36 for regulation by frequency modulation of the pulse generator 12. The series inductor 20, the transformer primary 18, and the series-resonant capacitor 22 operate as a resonant circuit to produce sinusoidal current pulses in the transformer primary 18. The sinusoidal current pulses, having frequency components mainly at the fundamental resonant frequency, account for a significant reduction in EMI.

The FM fundamental resonant power supplies of the prior art have several disadvantages. For example:

1. Limited dynamic range. The dynamic range of regulation is directly proportional to the relative frequency range of the pulse generator 12. The maximum frequency is limited by the switching characteristics of the pulse generator 12 and the power switches 16. The minimum frequency is limited by transient response and output filtering considerations. Thus regulation from no load to full load cannot be achieved without wasteful use of a dummy load and/or an auxillary shunt regulator.

2. High circulating currents. The resonant circuitry produces high peak current levels approximately 40 percent higher than in conventional power inverters. The power switches, transformer, series resonant inductor and capacitor must each carry this high current. Consequently, the power supply is wasteful of energy and more expensive to produce, requiring components with increased current and power ratings and means for dissipating the wasted energy.

3. Circuit complexity. The FM control circuits required for regulating the output voltage while maintaining resonance are more complex then conventional PWM control circuits, resulting in higher manufacturing costs.

4. Low power rating. The maximum output of the FM fundamental resonant power supplies is limited to about 100 watts due to the unavailability of suitable capacitors having low equivalent series resistances and high ripple current ratings for the resonant circuit and for filtering the output voltage.

Accordingly there is a need for an inverter power supply that produces low EMI, has high output power capacity and wide dynamic range, and is inexpensive to produce.

SUMMARY

The present invention is directed to a power supply that satisfies this need. The power supply of the present invention meets these needs by incorporating a fixed frequency harmonic semi-resonant inverter.

In one version of the invention, the power supply includes an isolation transformer having a primary winding connected through switching means to a DC input, and a secondary winding connected to a rectifier and filter to produce a DC output voltage, control means for fixed frequency pulse width modulation of the switching means to stabilize the DC output voltage, and a circuit associated with the transformer for producing resonance at a harmonic of the fixed frequency.

The DC input can be taken from a filtered rectifier circuit connected to an AC power source.

Preferably the resonant circuit includes an inductive element in series with the primary winding and a capacitive element across the secondary winding for including primary and secondary leakage inductance of the transformer in a composite resonant inductance.

Preferably the resonance is at a frequency of approximately the second harmonic of the fixed frequency for permitting significant reductions in EMI over a wide dynamic range of regulation while allowing use of pulse width modulation control techniques.

When the range of regulation provides for variations in input voltage as well as output loading, the resonant frequency can be at a frequency corresponding to modulation pulse widths at maximum output loading and minimum input voltage for reducing worst-case EMI.

In another version of the invention, the resonance is at a frequency much higher then the fixed frequency, preferably between approximately the fifth and the twentieth harmonic of the fixed frequency for reducing peak currents in the switching means and for facilitating operation of the filter without producing excessive EMI.

The transformer can be provided with an auxiliary winding, the auxiliary winding being connected to an auxiliary rectifier and an auxiliary filter for producing an auxiliary output.

In another version of the power supply, an isolation transformer has a primary winding connected through switching means to a DC input and a secondary winding connected to a rectifier and filter for producing a DC output voltage, the switching means operating at a fixed frequency and constant pulse width, the power supply also having a circuit associated with the transformer for producing resonance at a harmonic of the fixed frequency. This version of the present invention can be regulated or unregulated, the unregulated version being particularly useful in motor control circuits and in balasts for arc lamps.

Thus an inverter power supply is provided that produces low EMI by reducing transformer switching speeds, has high power output and wide dynamic range, and is inexpensive to produce in that low-cost PWM control and transformer construction can be used.

DRAWINGS

These and other features, aspects, and advantages of the present invention will become better understood with reference to the following description, appended claims, and accompanying drawings where:

FIG. 1 is a simplified schematic of a prior art power supply incorporating a fixed pulse width series resonant circuit in the primary of an inverter transformer, a frequency modulator controlling the pulse repetition rate for regulating an output voltage;

FIG. 2 simplified schematic of a pulse width modulated harmonic semi-resonant power supply according to the present invention;

FIG. 3 is a diagram of prior art electrical signals present during conventional operation of the circuit of FIG. 2 without the harmonic semi-resonance; and FIG. 4 is a diagram of electrical signals present during operation circuit of FIG. 2 with resonance at about the second harmonic of a fixed modulation frequency;

FIG. 5 is a diagram of electrical signals present during operation of the circuit of FIG. 2 with resonance at about the thirteenth harmonic of the fixed modulation frequency; and FIG. 6 is a fragmentary diagram of a portion of FIG. 4 above line 6—6 in FIG. 4, with an increased modulation duty cycle producing an off-resonant condition.

DESCRIPTION

The present invention is directed to a switched inverter power supply having harmonic resonant circuitry for producing low levels of EMI.

With reference to FIG. 2, a power supply 40 according to the present invention comprises an EMI filter 42, driven by a suitable source of AC electrical power, the EMI filter 42 driving a bridge rectifier 44, an unregulated DC voltage being produced across an associated input capacitor 46. Each side of the input capacitor 46 is connected through a respective input choke 48 to a corresponding positive bus 50 and a negative bus 52 for providing a DC input to switching circuitry as described herein. A bus capacitor 54, connected between the positive bus 50 and the negative bus 52, filters the DC voltage. The input chokes 48 operate to limit transient currents in the input capacitor 46 resulting from the switching activity. The bus capacitor 54 should have low equivalent series resistance (ESR) for limiting bus voltage fluctuations during the switching activity.

Some or all of the foregoing components are not required when the power supply 40 is to operate from a suitable source of DC power instead of the source of AC power.

A pair of power switches 56, designated 56a and 56b, is series-connected between the positive bus 50 and the negative bus 52 for driving a switch node 58. The power switches 56 can be low-cost power MOSFETs that advantageously permit high frequency operation in that they have no storage time, unlike conventional bipolar transistors. Instead of operating at 20–60 KHz, as in most conventional switching supplies, operation at frequencies above 100 KHz to beyond 250 KHz is now practical.

Control for the power switches 56 is provided by a PWM circuit 60, further described below. Control signals from the PWM circuit 60, amplified by a driver 62, excite a driver transformer 64 for DC isolation of the power switches 56 from the driver 62. The driver transformer 64 includes a pair of secondary windings designated 64a and 64b, and a primary winding designated 64c. The driver secondaries 64a and 64b of the driver transformer 64 are connected to the respective power switches 56a and 56b for producing the following switching conditions:

(a) When no signal is applied to the driver primary 64c, both of the power switches 56 remain off, allowing the switch node 58 to float between the positive bus 50 and the negative bus 52;

(b) When a positive signal is applied to the driver primary 64c, only the power switch 56a is on, effectively connecting the switch node 58 to the positive bus 50; and (c) When a negative signal is applied to the driver primary 64c, the power switch 56b is on, effectively connecting the switch node 58 to the negative bus 52.

A resonating inductor 66 is connected between the switch node 58 and a primary node 57. The primary node 57 is connected in series with a decoupling capacitor 68 and a primary winding 70a of an isolation transformer 70 to the positive bus 50.

A secondary winding 70b of the isolation transformer 70 produces alternating current at a voltage proportional to a turns ratio of the isolation transformer 70 and the AC source voltage. The secondary winding 70b can have a grounded center tap 70c and a pair of rectifier diodes 72 for rectifying the secondary voltage. The rectifier diodes 72 are connected to corresponding secondary nodes 74, designated 74a and 74b in FIG. 2, at opposite ends of the secondary winding 70b. The isolation transformer 70 includes an auxiliary winding 70d connected to a rectifying filter 179, further described below, for producing an auxilairy DC output 181.

A resonating capacitor 76 is connected across the secondary nodes 74, in parallel with the secondary winding 70b. The resonant capacitor 76, operating in conjunction with the resonating inductor 66 and a composite leakage inductance of the isolation transformer 70 produces resdnant and semi-resonant operation of the power supply 40 as described in greater detail below. The series capacitor 68 and the resonating capacitor 76 should have low ESR for proper operation.

The DC voltage produced by the rectifier diodes 72 is filtered by a filter inductor 78 and a filter capacitor 80. Further filtering at the resonant frequency can be provided by a low Q notch filter 79, producing a smooth DC voltage at an output node 81. The rectifying filter 179 includes counterparts of the filter capacitor 80 and at least one of the recifer diodes 72.

A pair of energy recovery diodes 82 can be connected between the switch node 58 and the respective positive bus 50 and negative bus 52 for preventing losses associated with reverse recovery times of the power switches 56.

The PWM circuit 60 is controlled by feedback from the output node 81 to produce alternating symmetrical control signals at a fixed frequency and variable pulse width for the driver 62. The PWM circuit 60 can comprise a readily available PWM integrated circuit such as a ZN 1066 switching regulator control and drive unit available from Ferranti Electronics Ltd., England. An auxiliary power supply (not shown) can be provided for the PWM circuit 60 and the driver 62. The PWM circuit 60 can also be connected to provide output current limiting using conventional methods.

In each cycle of the fixed frequency of the PWM circuit 60, symmetrical positive and negative pulses are generated in the driver primary 64c. With reference to FIGS. 3-5, an elementary switching sequence is as follows:

1. During a first period of time when a positive signal is present in the drive primary 64c, the power switch 56a is on, driving the switch node 58 to the same voltage as the positive bus 50. A positive current Id flows through the power switch 56a, producing a corresponding current Ipri in the isolation primary 70a, causing a voltage Vsec to be generated at the secondary node 74a. An output voltage Vout is subsequently produced at the output node 81 as described above.

2. During a second period of time when there is no drive to the driver primary 64c, the switching node 58 is allowed to float between the positive bus 50 and the negative bus 52, no current being produced in either of the power switches 56.

3. During a third period of time, equal in duration to the first period of time when a negative pulse is present in the driver primary 64c, the power switch 56b is on, the voltage between the node 58 and the negative bus 52 appearing across the power switch 56a. A negative current, corresponding to current in the power switch 56b, is produced in the isolation primary 70a, inducing a negative Vsec at the secondary node 74a. A corresponding positive voltage at the opposite secondary node 74b is rectified and filtered as described above.

4. During a fourth period of time equal in duration to the second period of time, no current flows in either of the power switches 56 as described above.

FIG. 3 is representative of electrical signals present in conventional prior art pulse width modulated fixed frequency switching power supplies. Conventional operation of the power supply 40 can be demonstrated by removing the resonating inductor 66 and the resonating capacitor 76, directly connecting the switching node 58 to the primary node 67. A burst of high frequency transients generating harmful EMI is present in both Vsec and Vout, following each of the time periods 1 and 3, caused by extremely fast interruptions of Ipri as each of the power switches 56 is turned off.

With reference to FIG. 4, a first version of the harmonic semi-resonant PWM power supply of the present invention has the resonating inductor 66 and the resonating capacitor 76 selected such that, taking into account the leakage inductance of the isolation transformer 70, the isolation transformer 70 resonates at a frequency greater than the fixed frequency of the PWM circuit 60. The resonant frequency can be made approximately double the fixed frequency such that over a range of pulse duty cycles, the isolation transformer 70 is excited above and below the resonant frequency. When the pulse width corresponds to the resonant frequency, Ipri closely approximates a half sine wave during each of the first and third time periods in FIG. 4.

The resonant frequency can be selected to correspond to modulation pulse widths produced by the PWM circuit 60 produced under typical conditions of input voltage and output loading for minimum EMI and maximum efficiency under the typical conditions.

Alternatively, the resonant frequency can be selected such that "worst-case" EMI is made as low as possible. In this context, "worst-case" EMI is the EMI generated under whatever conditions of input voltage and output loading of the power supply produce the greatest EMI. It is expected when the input voltage has a nominal value and can fluctuate about that value, that worst-case EMI will be lowest when the resonant frequency is selected to correspond to the modulation pulse width at maximum output power and nominal input voltage.

A significant feature of the present invention is that the switching speeds are greatly reduced at the isolation transformer 70, even when the resonant circuit is operating off of resonance. With reference to FIG. 6, when the pulse width is significantly increased beyond that corresponding to resonance, Ipri exhibits a damped oscillation. At the conclusion of the first period of time, a significant current interruption occurs, producing a relatively steep Ipri trailing edge. The Ipri trailing edge is indicative of increased switching speeds at the isolation transformer 70 when operating off resonance. Although these switching speeds are somewhat higher when operating off resonance, the interrupted current is lower in magnitude and switched much slower than in conventional switched inverter systems. Thus convenient PWM operation is now possible in a switched inverter power supply having wide dynamic range without generating high levels of EMI.

Another significant feature of the present invention is the placement of the resonating capacitor 76 across the secondary winding 70b. This placement causes a composite leakage inductance of the isolation transformer 70 to be included in resonance with the resonating inductor 66 and the resonating capacitor 76. In contrast, the FM fundamental resonant power supplies of the prior art have both the resonating inductor and capacitance in the primary circuit, such that only a primary leakage inductance is included in resonance.

Thus the present invention is tolerant of greater leakage inductance at a given switching frequency than is the prior art. Consequently, significant cost savings in manufacturing the isolation transformer 70 are made possible by the present invention, particularly in the light of increasingly stringent regulatory limitations on creepage and clearance making low leakage transformers difficult to wind.

It is expected that the FM fundamental resonant power supplies of the prior art can be improved by the feature of the present invention wherein the resonating capacitor is connected across a secondary transformer winding instead of in series with primary transformer winding.

It should be noted that in order to achieve the above advantages, the peak currents carried by the power switches 56, the resonating inductor 66, the decoupling capacitor 68, and the primary winding 70a are still approximately 40% higher for conventional FM operation than for the present harmonic resonance PWM arrangement.

With reference to FIG. 5, a second version of the present invention has the resonating capacitor 76 selected such that, taking into account the leakage inductance of the isolation transformer 70, the isolation transformer 70 resonates at a frequency much greater than the fixed frequency of the PWM circuit 60.

It has unexpectedly been discovered that by making the resonant frequency several times higher than the switching frequency, there is a significant reduction in the peak currents carried by the power switches 56, the resonating inductor 66, the decoupling capacitor 68, and the primary winding 70a. In fact, the peak currents can be reduced to levels approximating conventional PWM inverter operation without significantly increasing the EMI.

For example, the electronic signals shown in FIGS. 3-5 are representative of test results at a fixed switching frequency of about 155 kHz. In FIG. 5, the resonant frequency is at approximately 2 MHz, about the 13th harmonic of the switching frequency.

The peak values of both Ipri and Id in this version (FIG. 5) are reduced from the higher levels shown in FIG. 4 to levels approximately corresponding to the conventional prior art operation shown in FIG. 3. A corresponding improvement in efficiency from about 77% to about 85% was also demonstrated at an output power of 270 watts.

If the resonant frequency is decreased below about five times the switching frequency the peak current levels begin to approach the high levels of FIG. 4. If the resonant frequency is increased above about twenty times the switching frequency, the transformer switching speeds begin to approach the high levels associated with conventional operation, increasing the EMI. Thus it is preferred that the resonant frequency be chosen at between about the fifth and twentieth harmonic of the switching frequency.

Another significant feature of the present invention is that by resonating the isolation transformer at a harmonic of the switching frequency, the capacitance of the resonating capacitor 68 can be made smaller than for a fundamental resonant power supply of the same output power. Conversely, much higher power output is now possible with commercially available low ESR capacitors than in the FM fundamental resonant power supplies of the prior art. For example, a developmental 5-volt version of the power supply of the present invention has been successfully operated at up to 500 watts, demonstrating a several-fold improvement in output power potential over the prior art fundamental resonant power supply technology.

It should be appreciated that in the power supply of the present invention, radiated EMI from the bus capacitor 52, the power switches 56, and the energy recovery diodes 82 constitutes a greater proportion of the total EMI produced by the power supply 40. Accordingly, a power stage 84 including these components and connections thereto, should be confined in a small volume within the power supply 40 for further reducing the EMI.

Although the present invention has been described in considerable detail with regard to certain versions thereof, other versions are possible. For example, an unregulated power supply especially suited for motor controllers and ballasts for arc lamps can be made by substituting a fixed pulse width pulse generator for the PWM circuit 60. Also, the PWM circuit 60 can be controlled by the voltage difference between the positive bus 50 and the negative bus 52 for input voltage regulation. Therefore, the spirit and scope of the appended claims should not necessarily be limited to the description of the versions contained herein.

What is claimed is:

1. A power supply for producing a main DC output from a DC input comprising:
   (a) an isolation transformer having a primary winding and a main secondary winding;
   (b) switching means for driving the primary winding from the DC input, the switching means being responsive to a switching signal;
   (c) means for rectifying and filtering a voltage at the main secondary winding to produce the main DC output;
   (d) control means for producing the switching signal to provide pulse-width modulation of the switching means at a fixed frequency in response to changes in the main DC output voltage; and
   (e) means for producing resonance in the isolation transformer at a resonant frequency of from about five to about twenty times the fixed frequency during operation of the switching means for preventing electromagnetic interference by the power supply.

2. The power supply of claim 1 including means for producing the DC input from an AC input.

3. The power supply of claim 1 wherein the means for producing resonance includes an inductive element in series with the primary winding and a capacitive element in parallel with the main secondary winding for including a leakage inductance of the isolation transformer in the means for producing resonance.

4. The power supply of claim 3 wherein the control means comprises:
   (a) means for activating the switching means during a variable first period of time wherein the primary winding is connected to a positive polarity of the DC input;
   (b) means for deactivating the switching means during a second period of time wherein the primary winding is allowed to float between the positive polarity of the DC input and a negative polarity of the DC input;

(c) means for activating the switching means during a third period of time wherein the primary winding is connected to be negative polarity of the DC input, the third period of time being equal in duration to the first period of time; and
(d) means for deactivating the switching the switching means during a fourth period of time wherein the primary winding is allowed to float between the positive polarity and the negative polarity of the DC input, the fourth period of time being equal in duration to the second period of time, wherein the first, second, third, and fourth periods of time are sequential portions of a total period of time corresponding to the fixed frequency.

5. The power supply of claim 1 including an auxiliary secondary winding for the isolation transformer and means for rectifying an filtering a voltage at the auxiliary transformer secondary to produce an auxiliary DC output.

6. The power supply of claim 1 wherein the main DC output is maintained by the control means at a voltage of about five volts.

7. The power supply of claim 1 wherein the means for rectifying and filtering comprises:
(a) a rectifier circuit connected to the secondary winding for producing an unfiltered DC voltage;
(b) a fitler capacitor; and
(c) a filter impedence connected in series between the rectifier circuit and the filter capacitor for producing a filtered DC voltage at the filter capacitor.

8. A power supply for producing a main DC output from a DC input comprising:
(a) an isolation transformer having a primary winding and a main secondary winding;
(b) switching means for driving the primary winding from the DC input, the switching means being responsive to a switching signal;
(c) means for rectifying and filtering a voltage at the main secondary winding to produce the main DC output;
(d) control means for producing the switching signal to provide pulse-width modulation of the switching means at a fixed frequency in response to changes in the main DC output voltage; and
(e) means for producing resonance in the isolation transformer at a resonant frequency greater than the fixed frequency during operation of the switching means for preventing electromagnetic interference by the power supply, wherein the resonance is produced at approximately the fifth to approximately the twentieth harmonic of the fixed frequency for reducing EMI over a full range of modulation by the control means.

9. A power supply for producing a main DC output from a DC input comprising:
(a) an isolation transformer having a primary winding and a main secondary winding;
(b) switching means for driving the primary winding from the DC input, the switching means being responsive to a switching signal;
(c) means for recitfying and filtering a voltage at the main secondary winding to produce the main DC output;
(d) control means for producing the switching signal to provide pulse-width modulation of the switching means at a fixed frequency in response to changes in the main DC output voltage; and
(e) means for producing resonance in the isolation transformer at a resonant frequency greater than the fixed frequency during operation of the switching means for preventing electromagnetic interference by the power supply, wherein the resonance is produced at a frequency from about the fifth to about the twentieth harmonic of the fixed frequency for preventing electromagnetic interference by the power supply and for reducing peak current levels in the switching means, the isolation transformer, and the means for producing resonance.

10. A power supply for producing a DC output from a DC input comprising:
(a) an isolation transformer having primary and secondary windings;
(b) switching means for driving the primary winding from the DC input at a fixed frequency;
(c) means for rectifying and filtering a voltage at the secondary winding to produce the DC output;
(d) means for producing resonance in the isolation transformer during operation of the switching means, the means for producing resonance including an inductive element in series with the primary winding and a capacitor connected in parallel with the secondary winding for including a leakage inductance of the isolation transformer in the means for producing resonance at a resonanat frequency of from about five to about twenty times the fixed frequency for preventing electromagnetic interference by the power supply and for reducing peak current levels in the switching means, the isolation transformer, and the means for producing resonance.

11. A method for producing a main DC output from a DC input, the method comprising the steps of:
(a) providing an apparatus comprising:
(i) an isolation transformer having a primary winding and a main secondary winding;
(ii) switching means for driving the primary winding from the DC input, the switching means being responsive to a switching signal;
(iii) means for rectifying and filtering a voltage at the main secondary winding to produce the main DC output;
(iv) an inductive element connected in series between the switching means and the primary winding; and
(v) a capacitor connected in parallel with the secondary winding;
(b) switching the switching means at a fixed frequency; and
(c) resonating the inductive element, the isolation transformer, and he capacitor in response to the switching means at a resonant frequency of from about five to about twenty times the fixed frequency.

12. The method of claim 11 including the additonal step of modulating the switching means for producing variable width switching pulses in response to variatons in the DC output for regulating the DC output.

* * * * *